US010628194B2

United States Patent
Ryu et al.

(10) Patent No.: US 10,628,194 B2
(45) Date of Patent: Apr. 21, 2020

(54) TECHNIQUES FOR DATA MIGRATION

(71) Applicant: NetApp, Inc., Sunnyvale, CA (US)

(72) Inventors: Sungwook Ryu, Palo Alto, CA (US); Shweta Manohar Behere, Milpitas, CA (US); Joshua Hanan Flank, San Carlos, CA (US)

(73) Assignee: NetApp Inc., Sunnyvale, CA (US)

( * ) Notice: Subject to any disclaimer, the term of this patent is extended or adjusted under 35 U.S.C. 154(b) by 566 days.

(21) Appl. No.: 15/275,247

(22) Filed: Sep. 23, 2016

(65) Prior Publication Data

US 2017/0090972 A1    Mar. 30, 2017

Related U.S. Application Data

(60) Provisional application No. 62/235,039, filed on Sep. 30, 2015.

(51) Int. Cl.
*G06F 9/455* (2018.01)

(52) U.S. Cl.
CPC ........... *G06F 9/45558* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 5,710,917 A | 1/1998 | Musa et al. | |
| 8,386,838 B1 | 2/2013 | Byan | |
| 8,763,085 B1 | 6/2014 | Durie et al. | |
| 9,146,769 B1 | 9/2015 | Shankar et al. | |
| 2003/0195903 A1 | 10/2003 | Manley et al. | |
| 2008/0235238 A1 | 9/2008 | Jalobeanu et al. | |
| 2009/0265706 A1 | 10/2009 | Golosovker et al. | |
| 2010/0070725 A1 | 3/2010 | Prahlad et al. | |
| 2010/0257269 A1 | 10/2010 | Clark | |
| 2011/0131524 A1 | 6/2011 | Chang et al. | |
| 2013/0024722 A1 | 1/2013 | Kotagiri et al. | |

(Continued)

OTHER PUBLICATIONS

John, J., "Top Three Things to Know Before you Migrate to Clustered Data ONTAP", Datalink-Blog, Jul. 23, 2013, 5 pages.

*Primary Examiner* — Tammy E Lee
(74) *Attorney, Agent, or Firm* — Cooper Legal Group, LLC

(57) ABSTRACT

Techniques are disclosed herein for migrating virtual machines. In an embodiment, path configuration information for the source virtual machine is stored within storage allocated to a source virtual machine that is managed by a first hypervisor. A source virtual disk is allocated to the source virtual machine. The source virtual disk includes storage blocks that are accessible by a guest operating system of the source virtual machine. The source virtual disk further includes at least one source management block containing data utilized by the first hypervisor to manage the storage blocks. The guest operating system of the source virtual machine is migrated to a destination virtual machine managed by a second hypervisor. A destination virtual disk is generated that includes the storage blocks that are accessible by the migrated guest operating system. The destination virtual disk further includes at least one destination management block containing data utilized by the second hypervisor to manage the storage blocks.

20 Claims, 10 Drawing Sheets

(56) References Cited

U.S. PATENT DOCUMENTS

| | | | |
|---|---|---|---|
| 2013/0139155 A1* | 5/2013 | Shah | G06F 9/45558 |
| | | | 718/1 |
| 2013/0185715 A1* | 7/2013 | Dunning | G06F 9/45558 |
| | | | 718/1 |
| 2013/0298125 A1* | 11/2013 | Hutchins | G06F 16/16 |
| | | | 718/1 |
| 2013/0343385 A1 | 12/2013 | Benny et al. | |
| 2014/0149983 A1 | 5/2014 | Bonilla et al. | |
| 2015/0058382 A1* | 2/2015 | St. Laurent | G06F 9/45558 |
| | | | 707/823 |
| 2015/0134615 A1 | 5/2015 | Goodman I et al. | |
| 2015/0140974 A1 | 5/2015 | Liimatainen | |
| 2015/0324216 A1 | 11/2015 | Sizemore et al. | |
| 2015/0324217 A1 | 11/2015 | Shilmover et al. | |
| 2016/0241573 A1 | 8/2016 | Mixer | |

\* cited by examiner

TECHNIQUES FOR DATA MIGRATION

BACKGROUND

The disclosure generally relates to the field of data processing, and more particularly to virtual machine management.

A virtual machine (VM) is a software implementation of a machine, such as a computer, that executes programs like a physical machine. A VM allows multiple operating systems to co-exist on a same hardware platform in strong isolation from each other, utilize different instruction set architectures, and facilitate high-availability and disaster recovery operations.

In some situations, it may be desirable to change from one type of VM architecture to another and/or to move data hosted at one type of VM into another type of VM. Typically, this requires that the information in the current (source) VM be copied into the new (destination) VM. Migrating data between VM architectures, however, may be problematic. For instance, different types of VMs may use different, possibly proprietary, conventions for locating objects stored in the VM hypervisor's file system or namespace and/or may rely on proprietary commands which need to be invoked during the migration process.

As a result, migration may be a complex process that must be overseen by a skilled administrator familiar with architecture-specific naming conventions and commands that must be executed on the source VM and destination VM in order to effect the migration. Accordingly, migration may cause a disruption in services, lengthy migration times, or in some cases lead to data corruption.

BRIEF DESCRIPTION OF THE DRAWINGS

Aspects of the disclosure may be better understood by referencing the accompanying drawings.

DESCRIPTION

Figure 1A:
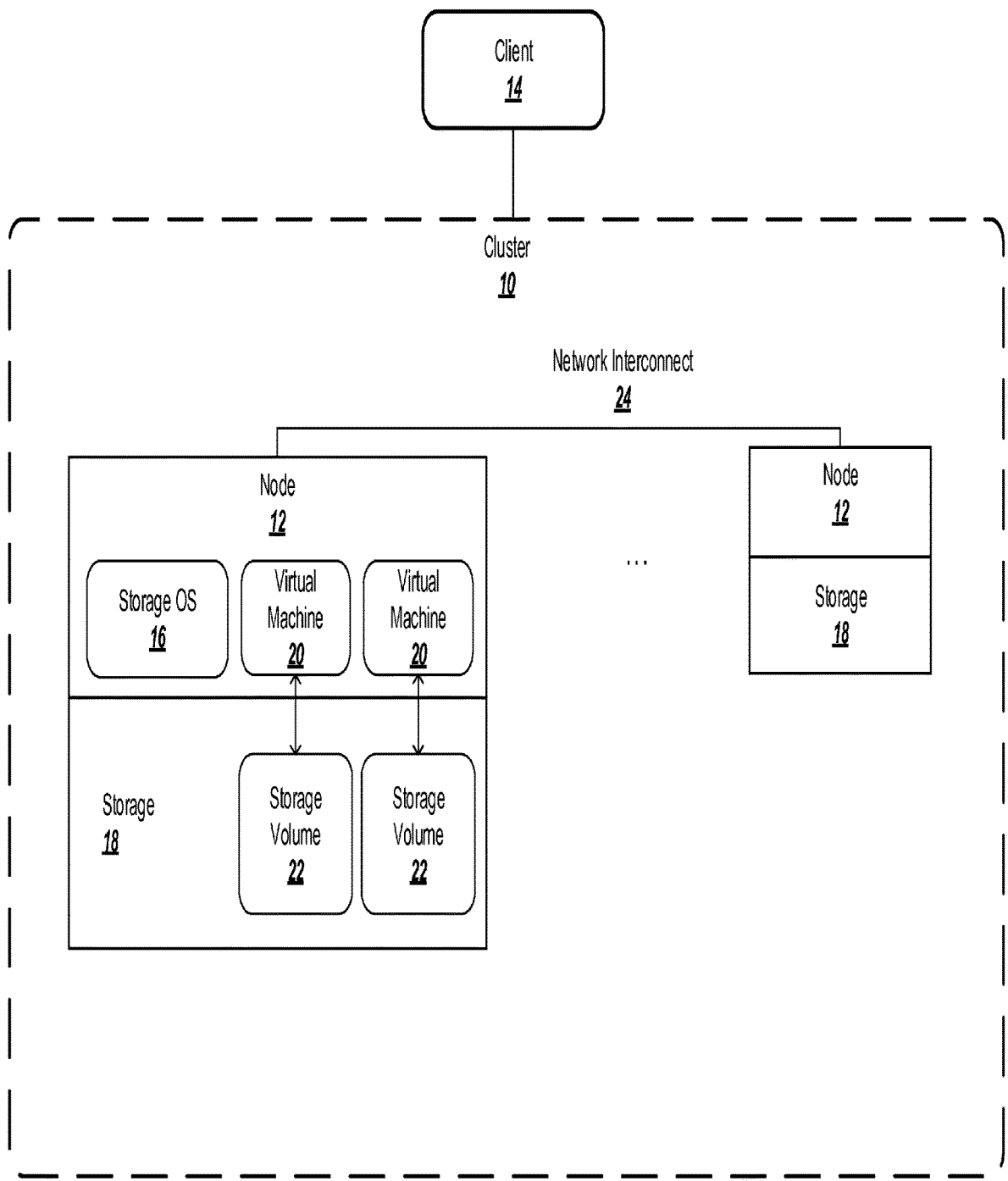
FIG. 1A depicts an exemplary cluster hosting VMs.

The description that follows includes example systems, methods, techniques, and program flows that embody aspects of the disclosure. However, it is understood that this disclosure may be practiced without these specific details. In other instances, well-known instruction instances, protocols, structures and techniques have not been shown in detail in order not to obfuscate the description.

Overview

Converting a VM from management by one type of hypervisor to another type of hypervisor may be problematic. For example, data may need to be copied between the source VM and the destination VM, but the different types of VM hypervisors may use different formats for representing data locations, and may use different concepts in identifying locations (e.g., data stores versus disk shares). Moreover, in order to set up a destination VM so that a user or software can continue to use the destination VM in the same manner as the source VM, the configuration of the source VM (e.g., the names and types of drives, particular types of network interfaces, etc.) must be recreated at the destination VM. This may require that hypervisor-specific commands be issued at both the source VM and the destination VM, in a particular order. Accordingly, conversion between different types of VMs may require a great deal of knowledge about each type of hypervisor, which may require that conversion be handled by a skilled administrator familiar with the intricacies of many different types of hypervisors.

The present application provides exemplary methods, mediums, and systems for automatically converting a VM from management by one type of hypervisor to management by a second, different type of hypervisor. The exemplary method involves: (1) discovering information about the source VM; (2) storing the information in the source VM; (3) making a backup of the source VM data; (4) copying the source VM data using cloning; (5) starting the destination VM with the cloned data by attaching the copied disks to the destination VM; and (6) restoring the source VM to its original state.

Steps (1) and (5) may involve calling VM API commands, which can be proprietary. In some embodiments, the first type of hypervisor (the source hypervisor) may a HyperV hypervisor, and the second type to hypervisor (the destination hypervisor) may be a VMWare hypervisor.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

As used herein, the identifiers "a" and "b" and "c" and similar designators are intended to be variables representing any positive integer. Thus, for example, if an implementation sets a value for a=5, then a complete set of components 122-a may include components 122-1, 122-2, 122-3, 122-4 and 122-5. The embodiments are not limited in this context.

Example Illustrations

Figure 1B:
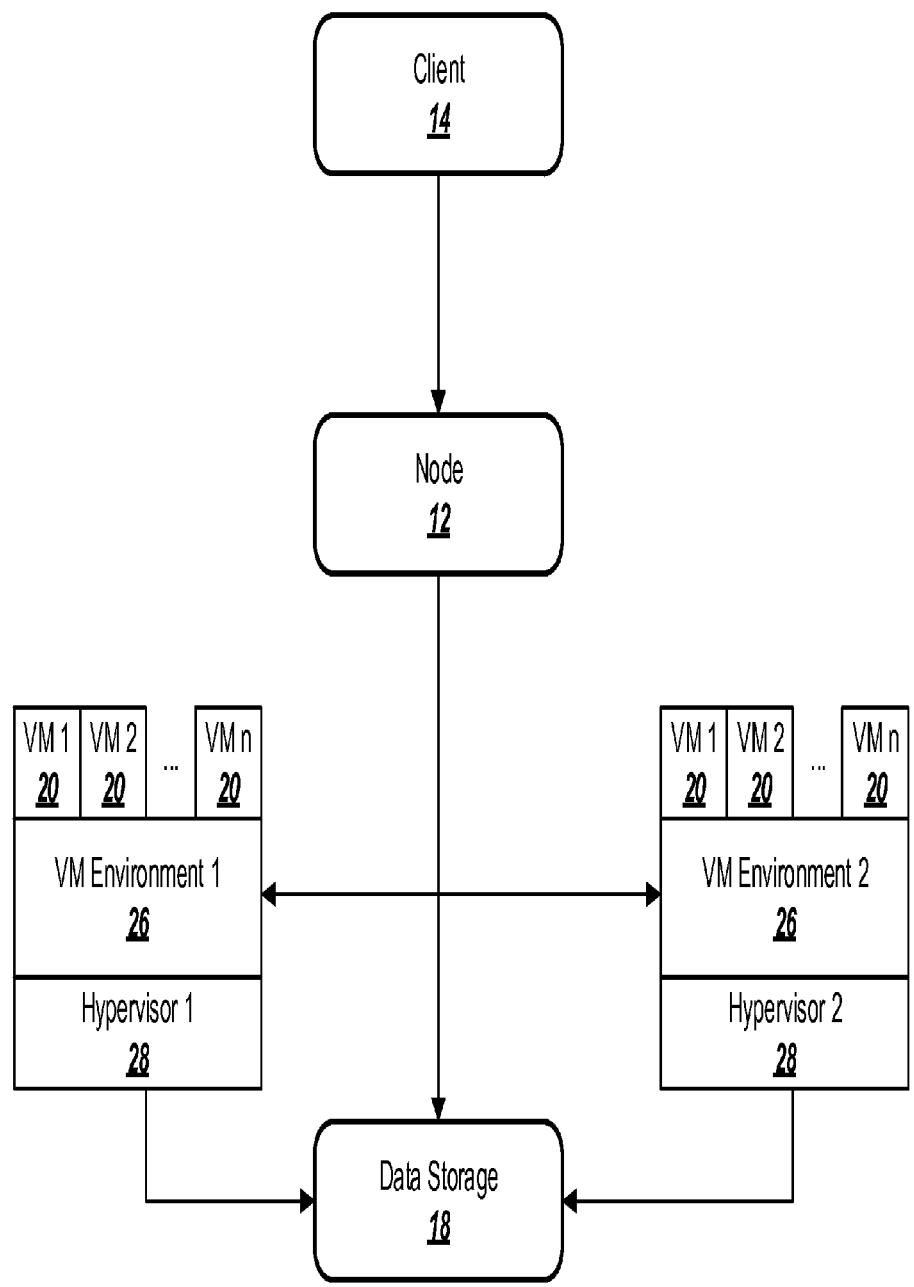
FIG. 1B depicts an exemplary environment suitable for use with embodiments described herein.

FIGS. 1A and 1B depict suitable environments in which the exemplary destination paths and storage mappings may be employed.

FIG. 1A depicts an example of a cluster 10 suitable for use with exemplary embodiments. A cluster 10 represents a collection of one or more nodes 12 that perform services, such as data storage or processing, on behalf of one or more clients 14.

In some embodiments, the nodes 12 may be special-purpose controllers, such as fabric-attached storage (FAS) controllers, optimized to run a storage operating system (OS) 16 and manage one or more attached storage devices 18. The nodes 12 provide network ports that clients 14 may use to access the storage 18. The storage 18 may include one or more drive bays for hard disk drives (HDDs), flash storage, a combination of HDDs and flash storage, and other non-transitory computer-readable storage mediums.

The storage OS 16 may be an operating system configured to receive requests to read and/or write data to one of the storage devices 18 of the cluster 10, to perform load balancing and assign the data to a particular storage device 18, and to perform read and/or write operations (among other capabilities). The storage OS 16 serves as the basis for virtualized shared storage infrastructures, and may allow for nondisruptive operations, storage and operational efficiency, and scalability over the lifetime of the system.

The nodes 12 may be connected to each other using a network interconnect 24. One example of a network interconnect 24 is a dedicated, redundant 10-gigabit Ethernet interconnect. The interconnect 24 allows the nodes 12 to act as a single entity in the form of the cluster 10.

A cluster 10 provides hardware resources, but clients 14 may access the storage 18 in the cluster 10 through one or more storage VMs (SVMs) 20. SVMs 20 may exist natively inside the cluster 10. The SVMs 20 define the storage available to the clients 14. SVMs 20 define authentication, network access to the storage in the form of logical interfaces (LIFs), and the storage itself in the form of storage area network (SAN) logical unit numbers (LUNs) or network attached storage (NAS) volumes.

SVMs 20 store data for clients 14 in flexible storage volumes 22. Storage volumes 22 are logical containers that contain data used by applications, which can include NAS data or SAN LUNs. The different storage volumes 22 may represent distinct physical drives (e.g., different HDDs) and/or may represent portions of physical drives, such that more than one SVM 20 may share space on a single physical drive.

Clients 14 may be aware of SVMs 20, but they may be unaware of the underlying cluster 10. The cluster 10 provides the physical resources the SVMs 20 need in order to serve data. The clients 14 connect to an SVM 20, rather than to a physical storage array in the storage 18. For example, clients 14 require IP addresses, World Wide Port Names (WWPNs), NAS volumes, SMB (CIFS) shares, NFS exports, and LUNs. SVMs 20 define these client-facing entities, and use the hardware of the cluster 10 to deliver the storage services. An SVM 20 is what users connect to when they access data.

Connectivity to SVMs 20 is provided through logical interfaces (LIFs). A LIF has an IP address or World Wide Port Name used by a client or host to connect to an SVM 20. A LIF is hosted on a physical port. An SVM 20 can have LIFs on any cluster node 12. Clients 14 can access data regardless of the physical location of the data in the cluster 10. The cluster 10 will use its interconnect 24 to route traffic to the appropriate location regardless of where the request arrives. LIFs virtualize IP addresses or WWPNs, rather than permanently mapping IP addresses and WWPNs to NIC and HBA ports. Each SVM 20 may use its own dedicated set of LIFs.

Like compute VMs, SVMs 20 decouple services from hardware. Unlike compute VMs, a single SVM 20 can use the network ports and storage of many nodes 12, enabling scale-out. One node's 12 physical network ports and physical storage 18 also can be shared by many SVMs 20, enabling multi-tenancy.

A single cluster 10 can contain multiple SVMs 20 targeted for various use cases, including server and desktop virtualization, large NAS content repositories, general-purpose file services, and enterprise applications. SVMs 20 can also be used to separate different organizational departments or tenants. The components of an SVM 20 are not permanently tied to any specific piece of hardware in the cluster 10. An SVM's volumes 22, LUNs, and logical interfaces can move to different physical locations inside the cluster 10 while maintaining the same logical location to clients 14. While physical storage and network access moves to a new location inside the cluster 10, clients 14 can continue accessing data in those volumes or LUNs, using those logical interfaces.

This capability allows a cluster 10 to continue serving data as physical nodes 12 are added or removed from the cluster 10. It also enables workload rebalancing and native, nondisruptive migration of storage services to different media types, such as flash, spinning media, or hybrid configurations. The separation of physical hardware from storage services allows storage services to continue as all the physical components of a cluster are incrementally replaced. Each SVM 20 can have its own authentication, its own storage, its own network segments, its own users, and its own administrators. A single SVM 20 can use storage 18 or network connectivity on any cluster node 12, enabling scale-out. New SVMs 20 can be provisioned on demand, without deploying additional hardware.

One capability that may be provided by a storage OS 16 is generating a read-only point-in-time image of one or more files, blocks, storage volumes, etc. Generating a read-only point-in-time image is often referred to as snapshotting. When a snapshot copy of a volume 22 is taken, a read-only copy of the data in the volume 22 at that point in time is created. That means that application administrators can restore LUNs using the snapshot copy, and end users can restore their own files.

Snapshot copies are high-performance copies. When writes are made to a flexible volume 22 that has an older snapshot copy, the new writes are made to free space on the underlying storage 18. This means that the old contents do not have to be moved to a new location. The old contents stay in place, which means the system continues to perform quickly, even if there are many Snapshot copies on the system. Volumes 22 can thus be mirrored, archived, or nondisruptively moved to other aggregates.

Therefore, snapshotting allows clients 14 to continue accessing data as that data is moved to other cluster nodes. The cluster 10 may therefore continue serving data as physical nodes 12 are added or removed from it. Snapshotting also enables workload rebalancing and nondisruptive migration of storage services to different media types. No matter where a volume 22 goes, it keeps its identity. That means that its snapshot copies, its replication relationships, its deduplication, and other characteristics of the flexible volume remain the same.

The storage OS 16 may utilize hypervisor-agnostic or hypervisor-independent formatting, destination paths, and configuration options for storing data objects in the storage devices 18. For example, the storage OS 16 may use a storage file system that delivers storage and operational efficiency technologies such as fast, storage-efficient copies; thin provisioning; volume, LUN, and file cloning; deduplication; and compression. The storage file system may accelerate write operations using nonvolatile memory inside the storage controller, in conjunction with optimized file layout on the underlying storage media. The storage OS 16 may enable integration with various types of differently configured hypervisors.

Although the data objects stored in each VM's storage volume 22 may be exposed to the client 14 according to hypervisor-specific formatting and path settings, the underlying data may be represented according to the storage OS's hypervisor-agnostic configuration.

Management of the cluster 10 is often performed through a management network. Cluster management traffic can be placed on a separate physical network to provide increased security. Together, the nodes 12 in the cluster 10, their client-facing network ports (which can reside in different network segments), and their attached storage 18 form a single resource pool.

FIG. 1B shows the configuration of the SVMs 20 in more detail. A client 14 may be provided with access to one or more VMs 20 through a node 12, which may be a server. Typically, a guest OS (distinct from the storage OS 16) runs in a VM 20 on top of an execution environment platform 26, which abstracts a hardware platform from the perspective of the guest OS. The abstraction of the hardware platform, and the providing of the VM 20, is performed by a hypervisor 28, also known as a VM monitor (VMM), which runs as a piece of software on a host OS. The host OS typically runs on an actual hardware platform, though multiple tiers of abstraction may be possible. While the actions of the guest OS are performed using the actual hardware platform, access to this platform is mediated by the hypervisor 28.

For instance, virtual network interfaces may be presented to the guest OS that present the actual network interfaces of the base hardware platform through an intermediary software layer. The processes of the guest OS and its guest applications may execute their code directly on the processors of the base hardware platform, but under the management of the hypervisor 28.

Data used by the VMs 20 may be stored in the storage system 18. The storage system 18 may be on the same local hardware as the VMs 20, or may be remote from the VMs 20. The hypervisor 28 may manage the storage and retrieval of data from the data storage system 18 on behalf of the VMs 20. Different types of VMs 20 may be associated with different hypervisors 28. Each type of hypervisor 28 may store and retrieve data using a hypervisor-specific style or format.

For example, multiple vendors provide hypervisors 28 for the execution of VMs 20 using abstraction technology unique to the vendor's implementation. The vendors use technology selected according to their own development process. However this technology is frequently different from vendor to vendor. Consequently, the guest OS has tailored virtual hardware and drivers to support the vendor implementation. This variation may lead to a core incompatibility between VM platforms. For example, different VM platforms may use different technologies for bridging to a network, where virtualized network interfaces are presented to the guest OS. Similarly, different VM platforms may use different formats for arranging the data stored in virtual disks onto actual storage hardware.

In some circumstances, an administrator may wish to migrate existing VMs 20 running under the management of one type of hypervisor 28 to management by a different type of hypervisor 28. However, given the proprietary nature of hypervisor technology, VM migration may be very complex. For example, migrating a guest OS from one VM platform to another may require reconfiguration of the guest OS and modification of files stored on the host OS that are referenced by the hypervisor 28.

As used herein, migration refers to moving a VM 20 from a source to a destination. In a migration operation, the virtual hardware entities associated with the VM 20 (including the virtualized CPU, network card, memory, peripherals such as a DVD player, etc.) are recreated at the destination hypervisor 28. Migration can be a complicated operation, in which the sequence of operations can be important in order to provide reliable and accurate conversion of the data.

Traditionally, in order to migrate from one hypervisor 28 to another, an administrator may issue a complicated series of commands that reconfigures and converts a source VM into a destination VM. This may involve issuing commands to copy data from the source VM to the destination VM, which takes a significant amount of time (hours to days). This is typically a manual process requiring a great deal of knowledge of both the source VM platform and the destination VM platform and the associated commands that are used to reconfigure and convert each type of VM.

Because different hypervisors 28 format and store data according to different methodologies, it may be especially difficult to specify or identify the destination of the data transfer. The transfer may involve multiple steps requiring the location of the data to be specified according to different formats. A user desiring to migrate to a destination VM may be familiar with the style or formatting of the destination VM, but may be unfamiliar with the source VM or the intermediate formats. Exemplary embodiments address this problem by leveraging the above-described hypervisor-agnostic formatting of the storage OS 16 to copy or move the data automatically and behind-the-scenes. The end user may specify the destination of the data using the formatting style of the destination VM, without the need to be familiar with source or intermediate formatting styles.

Figure 2:
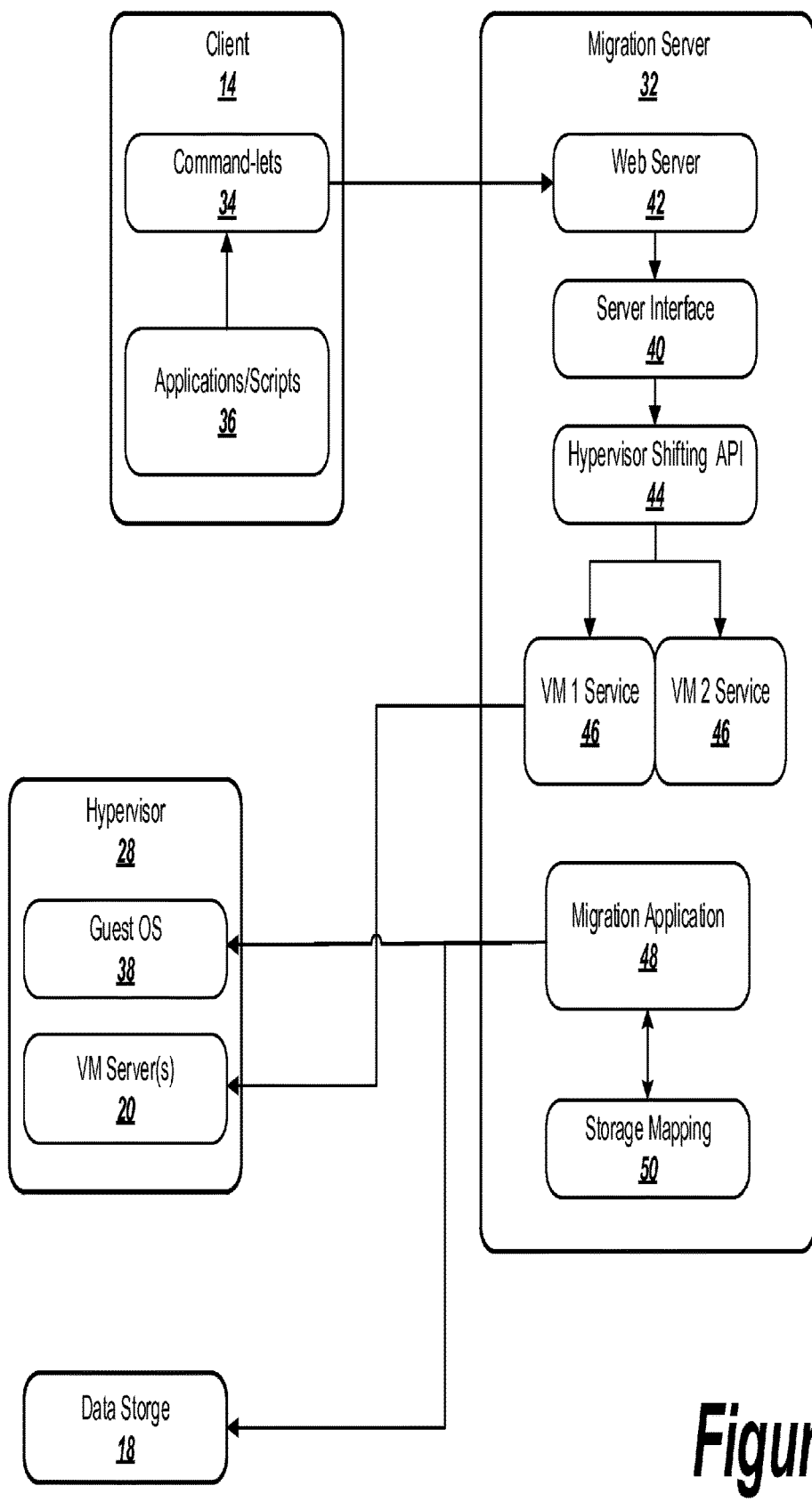
FIG. 2 depicts exemplary interactions between components of exemplary embodiments.

A general overview of an exemplary data migration is next described for context. FIG. 2 depicts exemplary interactions between the components of the exemplary environment as they perform a migration from one VM (referred to as a source VM) to another VM (referred to as a destination VM). The migration may involve copying the data associated with the source VM to storage volumes managed by the destination VM, and recreating the configuration of the source VM (such as network interfaces and user configuration settings) on the destination VM.

As shown in FIG. 2, a VM migration system 30 may include a client 14, a migration server 32, and one or more hypervisors 28 and/or storage resources 18. The client 14 may be a computing device through which a user or logic is able to execute commands (e.g., in the form of cmdlets 34, such as PowerShell cmdlets). The commands may be executed from an application or script 36.

The client 14 may initiate the migration of a guest OS 38 from a source VM managed by a source hypervisor 28 to a destination VM managed by a destination hypervisor 28. Data associated with the source VM and/or the destination VM may be stored in data storage 18 managed by an SVM 20.

The migration may be carried out by issuing the commands to the migration server 32, which performs the migration. The migration recreates the virtual hardware entities associated with the VM at the destination hypervisor. In performing the migration operation, only a source disk image is copied to the destination; the hardware setup is reconfigured to exist at the destination in the same configuration as at the source.

The migration server exposes an interface 40, such as a RESTful API. The interface 40 allows the client 14 to execute interface commands (e.g., methods or functions), which may have a one-to-one correspondence to commands available through the cmdlets 34. In some embodiments, the client 14 interacts directly with the interface 40 (e.g., by having a user issue commands to the interface 40 using the cmdlets 34 directly); however, as described in more detail below there may be advantages to interacting with the interface 40 indirectly through scripts 36 that call the cmdlets 34.

The interface 40 abstracts away many of the operations required to perform the migration. This allows the commands sent to the interface 40 to be relatively simple (e.g., a "convert" command that specifies only a VM name and a direction from a source VM type to a destination VM type). Commands issued to the interface 40 may be handled by a web server 42.

The commands issued to the interface 40 may then be sent to a Hypervisor Shifting API 44, which includes functionality for determining which hypervisor-specific commands need to be called in order to carry out the convert operation, and then calling the hypervisor-specific commands through proprietary APIs. The hypervisor-specific commands may be executed by hypervisor-specific services 46.

The guest OS 38 may be presented a virtual disk by the VMs 20, where the virtual disk is an abstraction of the physical storage used by the VMs 20. A file system in a data storage 18 may store a source VM virtual disk, where the source VM virtual disk is an arrangement of blocks corresponding to a virtual disk format used by the source hypervisor. The file system may further store a destination VM virtual disk, where the destination VM virtual disk is an arrangement of blocks corresponding to a virtual disk format used by the destination hypervisor. The source VM virtual disk and the destination VM virtual disk may be built from almost entirely the same set of blocks, with the common blocks being those that correspond to the storage of data visible to the guest OS 38, as described in more detail below in connection with FIG. 3.

Each of the source VM virtual disk and the destination VM virtual disk may have one or more blocks dedicated to storage of data and metadata used by the source hypervisor and destination hypervisor, respectively, that are not accessible to the guest OS 38. For example, one block may be exclusively used by the source hypervisor for storing data and metadata used for managing its access to the common blocks.

Because of the above-noted overlap in storage blocks, transitioning from the source hypervisor to the destination hypervisor may involve simply creating a new block, with data and metadata for managing the common blocks, and constructing a destination VM virtual disk from those blocks used by the source VM virtual disk that are not exclusive to the management data and metadata of the source hypervisor.

Prior to migration, the data for the source VM may be stored in a hypervisor-agnostic data format (e.g., storage OS/file system data format) in a data storage 18 embodied as a storage cluster. Although the storage OS may allow the underlying VM data to be exposed in different ways (e.g., using different storage location formats) depending on the type of VM 20 associated with the data, the storage OS may maintain a common representation that can be used to quickly convert the data from one VM 20 to another (e.g., in constant time, typically requiring minutes at most). Other types of data storage devices and formats may also be used in conjunction with exemplary embodiments.

A migration application 48 may interact with the source hypervisor, the destination hypervisor, the guest OS 206, and the data storage 18 to migrate the guest OS 38 running on the source VM from the source hypervisor to the destination hypervisor. The migration application 48 may also migrate individual data objects stored in the common disk blocks from management by a source VM to management by a destination VM.

The migration application 48 may generate one or more scripts that run in the guest OS 38 running on top of each of the source VM and the destination VM to perform the migration. The migration application 48 may use one or more scripts that run in the guest OS 38 on top of the source VM to gather configuration information for use in generation of one or more scripts that run in the guest OS 38 on top of destination VM. The migration application 48 may also make use of a storage mapping 50 to manage the migration of data stored in the data storage from the source VM to the destination VM. The storage mapping 50 is described in more detail below with respect to FIGS. 6-7.

The migration application 48 may send commands to and monitor the source hypervisor and destination hypervisor. For instance, the migration application 48 may script or use direct commands to initiate power cycles of the VMs 20 and use the power cycling of VMs 20 to monitor the progress of scripts. By using scripts that use the built-in scripting of the guest OS 38, the migration application 48 may avoid installing software agents within the guest OS for performing the migration, thereby simplifying the migration process.

VM Migration System

Figure 3:
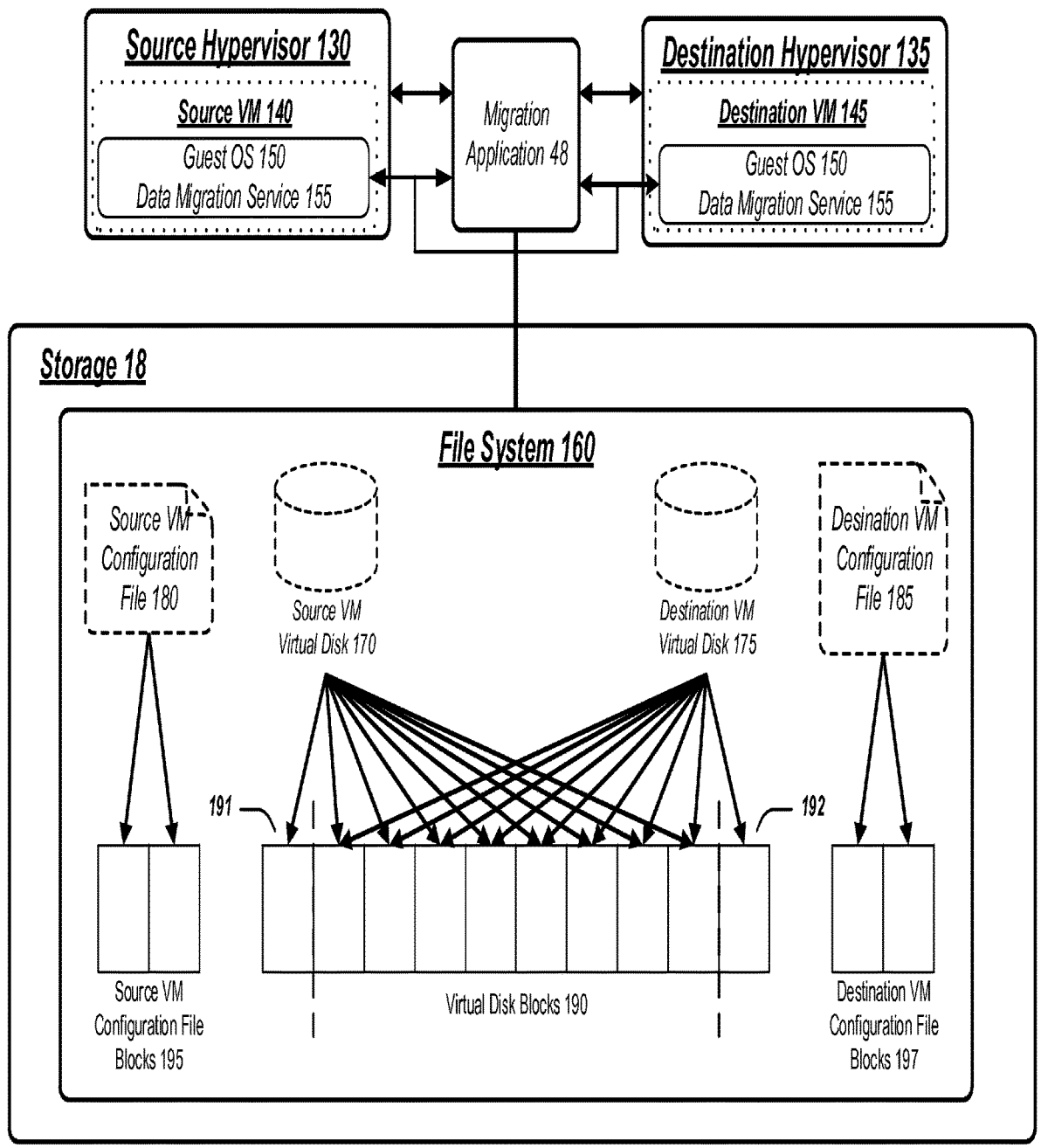
FIG. 3 depicts exemplary VM migration system suitable for use with exemplary embodiments described herein.

FIG. 3 is a block diagram depicting an exemplary VM migration system 100 for carrying out the above-described migration. In one embodiment, the VM migration system 100 may comprise a computer-implemented system having a software migration application 48 comprising one or more components. Although the VM migration system 100 shown in FIG. 3 has a limited number of elements in a certain topology, it may be appreciated that the VM migration system 100 may include more or less elements in alternate topologies as desired for a given implementation.

The VM migration system 100 may comprise the migration application 48. The migration application 48 may be generally arranged to migrate guest OS 150 from source VM 140 running on source hypervisor 130 to destination VM 145 running on destination hypervisor 135, wherein each of migration application 48, source hypervisor 130, and destination hypervisor 135 all run on top of a host OS.

A file system 160 may store data according to the format or style of a storage OS such as storage OS 16 in FIG. 1A. File system 160 may store various files used in the operation of source VM 140 and destination VM 145, and thereby the operation of guest OS 150. File system 160 may store various files used by migration application 48. File system 160 may store various files used by the host OS such as host OS 120 depicted in FIG. 4. File system 160 may be provided by the host OS or may be a third-party file system working in conjunction with the host OS. File system 160 may be a local file system, a network-accessible file system, a distributed file system, or use any other file system techniques for the storage of, maintenance of, and access to files.

File system 160 may store a source VM configuration file 180 used by source hypervisor 130 for the determination of various configurations of source VM 140. File system 160 may store destination VM configuration file 185 used by destination hypervisor 135 for the determination of various configurations of destination VM 145. Source VM configuration file 180 may be composed of one or more source VM configuration file blocks 195. Destination VM configuration file 185 may be composed of one or more destination VM configuration file blocks 197. The configuration of a VM may comprise, among other elements, specifying the configuration of the hardware platform to be virtualized, such as number and type of CPU, memory size, disk size, etc. The configuration information within configurations files 180 and 185 may further include connectivity configuration information such as network interface connectivity and storage device access connectivity information. In an embodiment, VM migration may include cloning the source configuration file 180 to form the destination configuration file 185 that is accessible by the destination hypervisor 135.

Guest OS 150 may be presented a virtual disk by the VMs, the virtual disk an abstraction of the physical storage used by the VMs. File system 160 may store source VM virtual disk 170, where source VM virtual disk 170 is an arrangement of blocks corresponding to a virtual disk format used by the source hypervisor 130. File system 160 may store destination VM virtual disk 175, where destination VM virtual disk 175 is an arrangement of blocks corresponding to a virtual disk format used by the destination hypervisor 135. Virtual disk blocks 190 are the joint collection of blocks used by both source VM virtual disk 170 and destination VM virtual disk 175. Source VM virtual disk 170 and destination VM virtual disk 175 may be generated from almost entirely the same set of blocks, with the common blocks being those that correspond to the storage of data visible to the guest OS 150. Each of the source VM virtual disk 170 and destination VM virtual disk 175 may have one or more blocks dedicated to storage of data and metadata used by the source hypervisor 130 and destination hypervisor 135, respectively, which is not accessible to the guest OS 150. For example, block 191 may be exclusively used by source hypervisor 130 for storing data and metadata used for managing its access to the common blocks of virtual disk blocks 190. Similarly, block 192 may be exclusively used by destination hypervisor 135 for storing data and metadata used for managing its access to the common blocks of virtual disk blocks 190. It will be appreciated that multiple blocks may be used by either or both of source hypervisor 130 and destination hypervisor 135 for the storage of this data and metadata. Because of this overlap in storage blocks, transitioning from source hypervisor 130 to destination hypervisor 135 may involve generating block 192, with its data and metadata for managing the common blocks, and constructing destination VM virtual disk 175 from those blocks used by source VM virtual disk 170 that are not exclusive to the management data and metadata of source hypervisor 130.

A data migration component or "agent" 155 may be installed in the guest OS 150 or may be a separate component in association with the guest OS 150 and also may be in communication with a host hypervisor 130 or 135. Alternatively or in addition, the data migration component 155 may be a separate entity run on a client device outside of the guest OS 150.

The data migration component 155 is controlled by a processor device and executes data migration tasks as described herein. The data migration component 155 may interact with the source hypervisor 130, the destination hypervisor 135, the guest OS 150, and the file system 160 to migrate data after detecting a change from the source hypervisor 130 to the destination hypervisor 135 or vice versa. In one embodiment, the data migration component 155 bypasses or eliminates the need for the migration application 48. When possible, the data migration component 155 is automatically pushed and installed into the guest OS 150 when the guest OS 150 credentials are known. Otherwise, the installation is performed by a user knowing the guest OS 150 credentials. Also, the in-guest utilities/tools may function as, and/or assist with, the data migration component 155 to eliminate and/or reduce the need for customized software.

The migration application 48 may interact with the source hypervisor 130, the destination hypervisor 135, the guest OS 150, and the file system 160 to migrate the guest OS 150 from the source hypervisor 130 to the destination hypervisor 135. The migration application 48 may generate one or more scripts that run in the guest OS 150 running on top of each of the source VM 140 and the destination VM 145 to perform the migration. The migration application 48 may use one or more scripts that run in the guest OS 150 on top of the source VM 140 to gather configuration information for use in generation of one or more scripts that run in the guest OS 150 on top of destination VM 145. The migration application 48 may send commands to and monitor the source hypervisor 130 and destination hypervisor 135. For instance, the migration application 48 may script or use direct commands to initiate power cycles of the VMs and use the power cycling of VMs to monitor the progress of scripts. By using scripts that use the built-in scripting of the guest OS 150 the migration application 48 may avoid installing software agents within the guest OS 150 for performing the migration, thereby simplifying the migration process.

Figure 4:
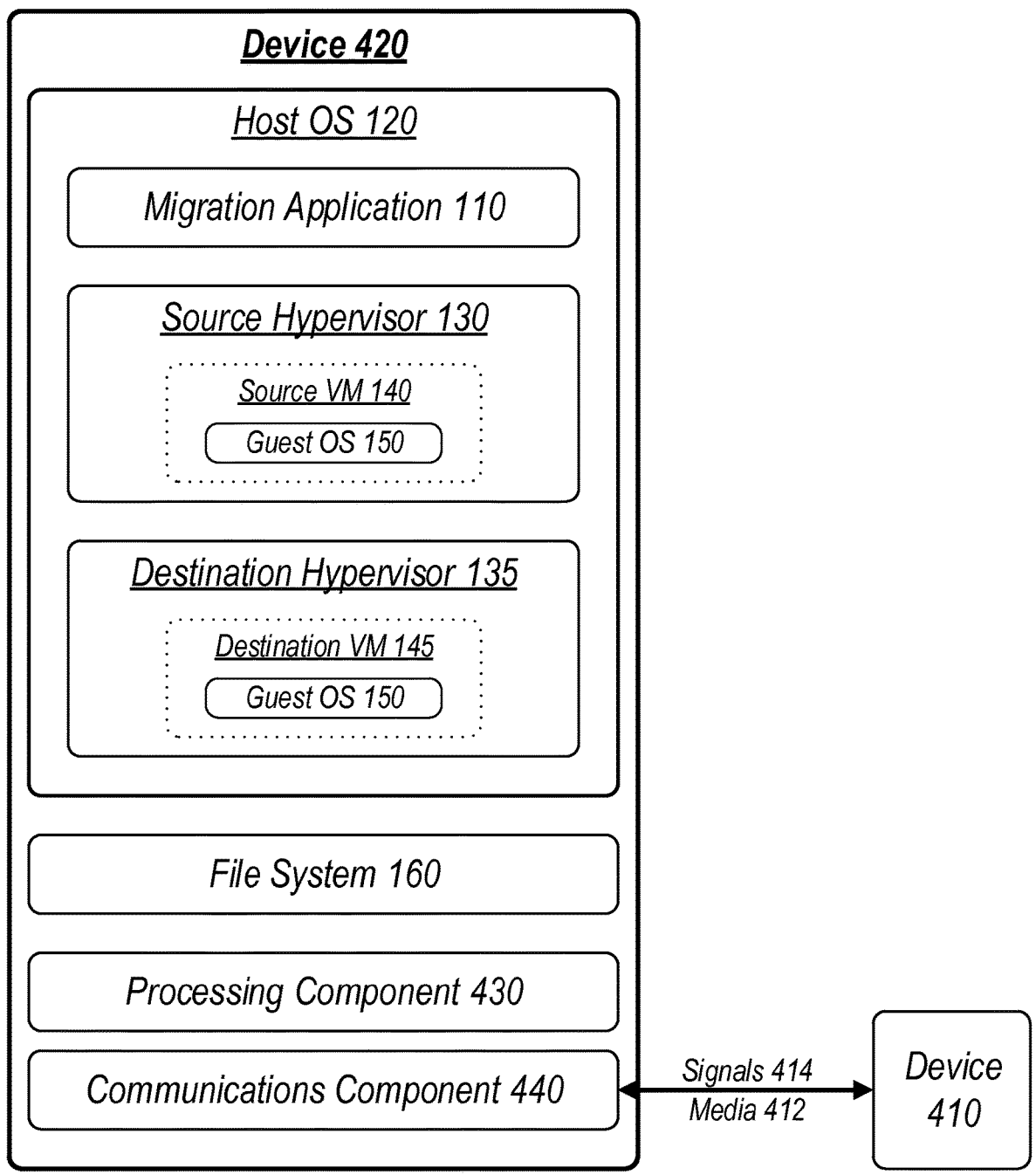
FIG. 4 depicts an exemplary centralized system suitable for use with exemplary embodiments described herein.
Figure 5:
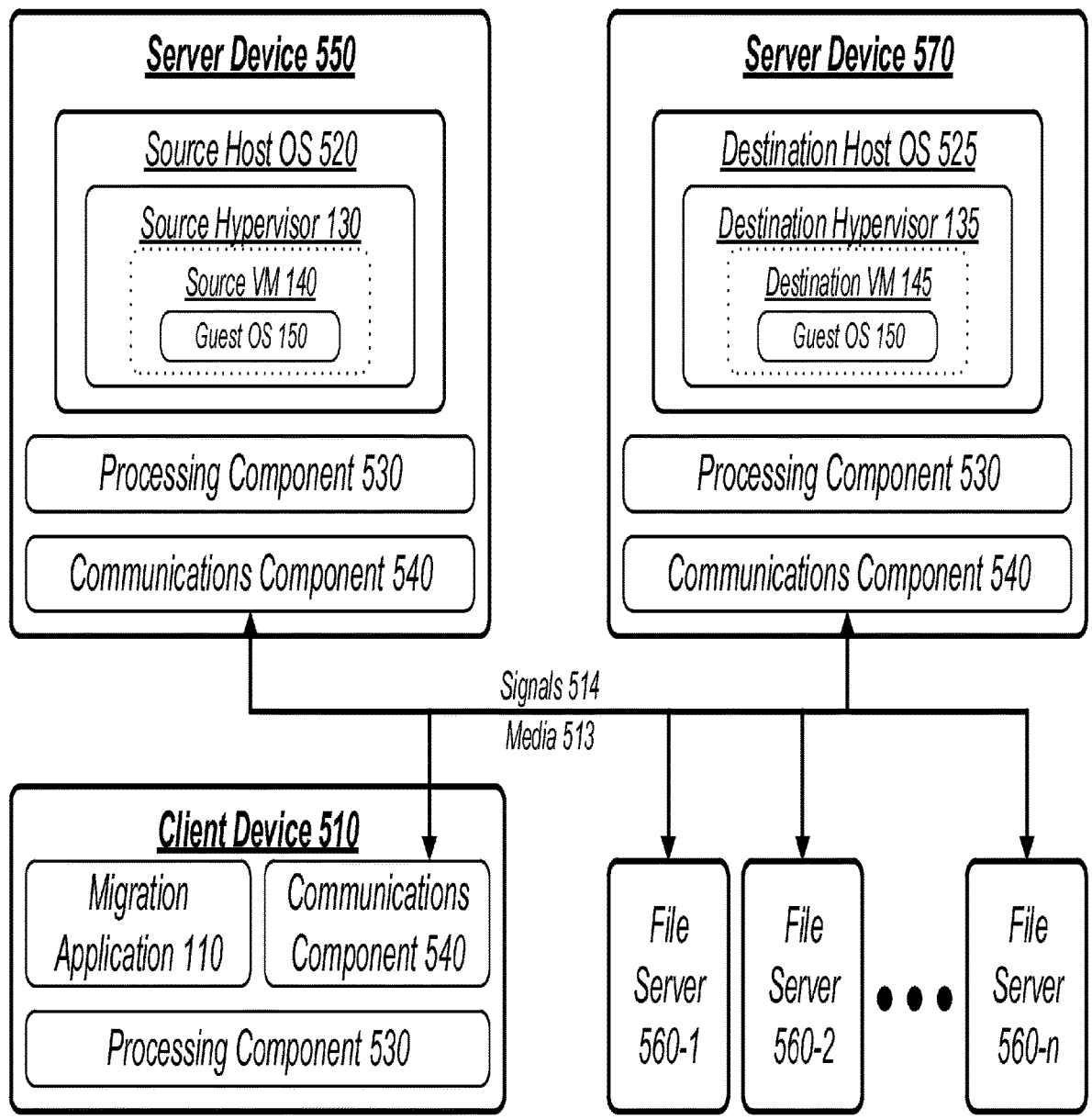
FIG. 5 depicts an exemplary distributed system suitable for use with exemplary embodiments described herein.

The above-described migration process may be carried out in a centralized environment (e.g., an environment in which the migration application 48, source hypervisor 130, destination hypervisor 135, and file system 160 are all hosted in the same device), or a distributed environment (in which some or all of these components are provided on different devices). FIG. 4 depicts an exemplary centralized system 400, while FIG. 5 depicts an exemplary distributed system 500.

Centralized Embodiments

FIG. 4 illustrates a block diagram of a centralized system 400 that may implement some or all of the structure and/or operations for a VM migration system, such as the VM migration system 100 shown in FIG. 3, in a single computing entity, such as entirely within a single device 420.

The device 420 may comprise any electronic device capable of receiving, processing, and sending information for the VM migration system. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 420 may execute processing operations or logic for the system using a processing component 430. The processing component 430 may comprise various hardware elements, software elements, or a combination of both.

Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 420 may execute communications operations or logic for the system using a communications component 440. The communications component 440 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 440 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 412 may include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 420 may communicate with a device 410 over a communications media 412 using communications signals 414 via the communications component 440. The device 410 may be internal or external to the device 420 as desired for a given implementation.

The device 420 may include the host OS 120, the host 120 running the migration application 110, source hypervisor 130, and destination hypervisor 135, with the source VM 140 and destination VM 145 provided by the respective hypervisors 130, 135. The device 420 may also host the file system 160 storing the virtual disk blocks 190 for the source VM virtual disk 170 and destination VM virtual disk 175. The migration application 110 may perform the migration of the guest OS 150 from the source VM 140 to the destination VM 145 on the device 420.

The device 410 may provide support or control for the migration operations of the migration application 110 and/or the hosting operations of the device 420 and host 120. The device 410 may be an external device externally controlling the device 420, such as where device 410 is a server device hosting the guest OS 150 and the device 420 is a client administrator device used to administrate device 410 and initiate the migration using migration application 110. In some of these cases, the migration application 110 may instead be hosted on the device 410 with the remainder of the VM migration system hosted on the device 420. Alternatively, the device 410 may have hosted the migration application 110 as a distribution repository, with the migration application 110 downloaded to the device 420 from the device 410.

Distributed Embodiments

FIG. 5 illustrates a block diagram of a distributed system 500. The distributed system 500 may distribute portions of the structure and/or operations for the VM migration system 100 across multiple computing entities. Examples of distributed system 500 may include without limitation a client-server architecture, a S-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 500 may comprise a client device 510 and server devices 550 and 570. In general, the client device 510 and the server devices 550 and 570 may be the same or similar to the client device 420 as described with reference to FIG. 4. For instance, the client device 510 and the server devices 550 and 570 may each comprise a processing component 530 and a communications component 540 which are the same or similar to the processing component 430 and the communications component 440, respectively. In another example, the devices 510, 550, and 570 may communicate over a communications media 513 using communications signals 514 via the communications components 540. The distributed system 500 may comprise a distributed file system implemented by distributed file servers 560 including file servers 560-1 through 560-n, where the value of n may vary in different embodiments and implementations. The local storage of the client device 510 and server devices 550, 570 may work in conjunction with the file servers 560 in the operation of the distributed file system, such as by providing a local cache for the distributed file system primarily hosted on the file servers 560 so as to reduce latency and network bandwidth usage for the client device 510 and server devices 550, 570.

The client device 510 may comprise or employ one or more client programs that operate to perform various methodologies in accordance with the described embodiments. In one embodiment, for example, the client device 510 may implement the migration application 110 initiating, managing, and monitoring the migration of the guest OS 150 from the source VM 140 to the destination VM 145. The client device 510 may use signals 514 to interact with the source hypervisor 130, destination hypervisor 135 and/or guest OS 150 while they are running on each of the source VM 140 and destination VM 145, and file servers 560.

The server devices 550, 570 may comprise or employ one or more server programs that operate to perform various methodologies in accordance with the described embodiments. In one embodiment, for example, the server device 550 may implement a source host OS 520 hosting the source hypervisor 130 providing the source VM 140. The server device 550 may use signals 514 to receive control signals from the migration application 110 on client device 510 and to transmit configuration and status information to the migration application 110. The server device 550 may use signals 514 communicate with the file servers 560 both for the providing of source VM 140 and for the migration of guest OS 150 from the source VM 140 to the destination VM 145.

The server device 570 may implement a destination host OS 525 hosting the destination hypervisor 135 providing the destination VM 145. The server device 570 may use signals 514 to receive control signals from the migration application 110 on client device 510 and to transmit configuration and status information to the migration application 110. The server device 570 may use signals 514 to communicate with the file servers 560 both for the provisioning of destination VM 145 and for the migration of guest OS 150 to the destination VM 145 from the source VM 140.

In some embodiments, the same server device may implement both the source hypervisor 130 and the destination hypervisor 135. In these embodiments, the migration application 110 hosted on a client device 510 may perform the migration of the guest OS 150 from the source VM 140 to the destination VM 145 on this single server device, in conjunction with migration operations performed using the distributed file system.

An exemplary method, medium, and system for converting one or more data objects managed by a source hypervisor into data objects managed by a destination hypervisor is next described with reference to FIG. 6.

Exemplary Methods, Mediums, and Systems

Figure 6:
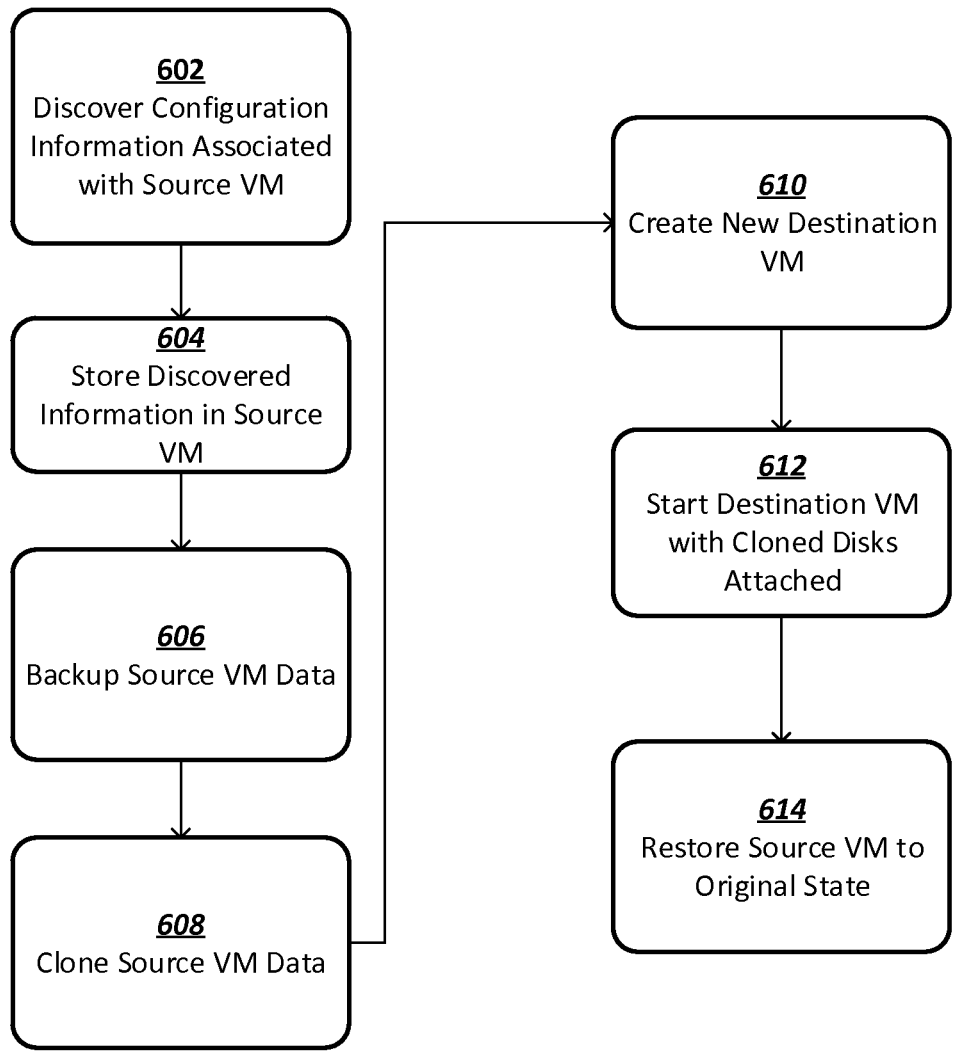
FIG. 6 depicts an overview of an exemplary method for converting a VM from one type of hypervisor to another.
Figure 7:
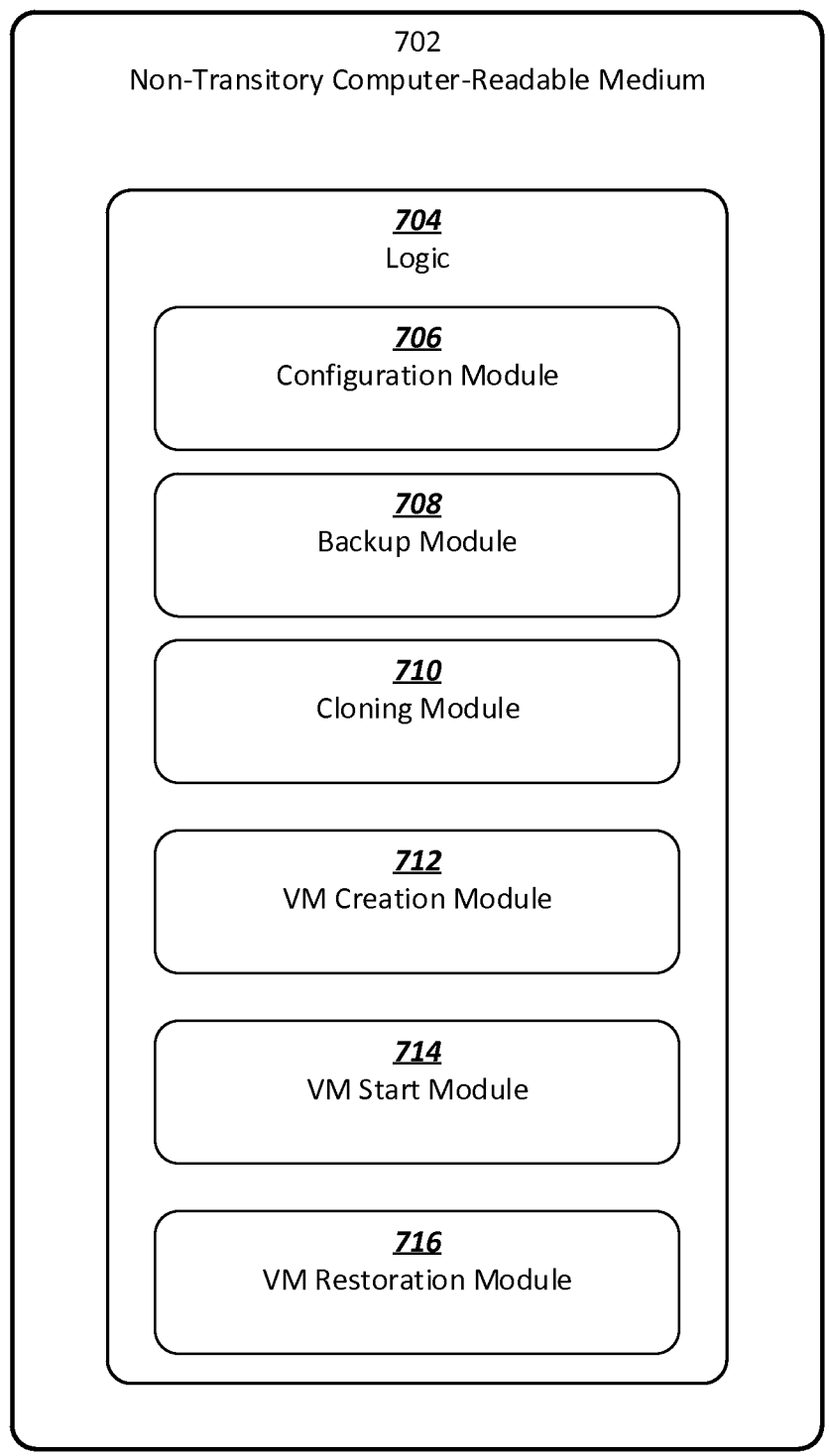
FIG. 7 depicts exemplary computing logic suitable for carrying out the method depicted in FIG. 6.

FIG. 6 depicts an exemplary conversion method, which may be implemented as computer-executable instructions stored on a non-transitory computer readable medium, as illustrated in FIG. 7.

With reference to FIG. 6, at step 602 the system may discover configuration information associated with the source VM. For example, the configuration information collected may include an NIC-to-MAC mapping between one or more network interfaces of the source VM and media access control addresses assigned to the one or more network interfaces of the source VM. This mapping may allow a logic flow to recreate the associations between non-virtualized, physical NICs and the virtualized NICs of the virtualized hardware environment despite changes in how the virtualized hardware environment is created. The configuration information may also include the locations of any storage resources used by the source VM such as addresses of storage devices used by the source VM.

As part of establishing the configuration, initial configuration parameters may be received by the system. Some initial configuration parameters may be specified through a script, and may be provided by a user. The initial configuration parameters may include: hypervisor information (e.g., the IP address and credentials for each hypervisor's server, such as an ESX server or a HyperV server); a network mapping (e.g., ESX vSwitch A to HyperV vSwitch B; because ESX and HyperV use different virtual switches in this example, the mapping needs to be specified to carry out the migration), information for the storage cluster (such as login credentials and the cluster's IP address), information about the guest OS; and other configuration parameters.

Using the initial configuration parameters, the system may automatically discover more detailed VM and guest OS information. For example, based on an input VM name, the migration server may query the VM to discover: the VM configuration (e.g., the number of CPUs, memory size, information about a DVD drive attached to the VM, etc.); a list of virtual disks with backend storage locations; NIC cards associated with the VM; and a disk driver mapping, among other possibilities.

The system may discover the initial or more detailed information by querying the source VM using commands (e.g., API commands) specific to the source VM's hypervisor. In one embodiment the API commands may be HyperV API commands.

At step 604, the discovered configuration information may be stored in the source VM. The discovered information may be stored in a designated location in the source VM that has been pre-assigned to hold configuration information for conversions. For example, the discovered configuration information may be stored in designated source VM configuration file blocks such as configuration file blocks 195 within source VM configuration file 180 depicted in FIG. 3. The system may be programmed to retrieve the configuration information from the designated location at later steps (e.g., steps 610 and 612). Steps 602 and 604 may be carried out by a configuration module 704, as depicted in FIG. 7.

At step 606, the system may back up the source VM's data including the discovered configuration information. At step 608, the system may clone the source VM's data to new blocks, e.g. using the above-described snapshotting feature.

At step 610, the system may create a new destination VM using the configuration parameters stored at step 604. For example, the system may create new CPU, memory, and graphics card allocations for the destination VM. The system may refrain from creating a disks allocation for the destination VM, since the disks storing the data cloned in step 608 will be used in connection with the destination VM.

At step 612, the system may start the destination VM created at step 610. The system may attach the disks storing the data cloned at step 608 to the destination VM to serve as the destination VM's disks. The system may run a script that automatically configures the destination VM's IP address (es), device layers, and network settings, among other possibilities. Step 612 may be carried out by calling commands specific to the destination VMs hypervisor (e.g., API commands). In one embodiment the API commands may be VMWare API commands At step 614, the system may restore the source VM to its original state. If a problem occurred during the conversion such that the original data of the source VM was corrupted, the system may restore the backup of the source VM data created at step 606.

With reference to FIG. 7, an exemplary computing system may store, on a non-transitory computer-readable medium 702, instructions that, when executed, cause the computing system to perform the steps described above in connection with FIGS. 1-6. The instructions may be embodied in the form of logic 704. The logic 704 may include: a configuration module 706 configured to execute instructions corresponding to steps 602 and 604 of FIG. 6; a backup module 708 configured to execute instructions corresponding to step 606 of FIG. 6; a cloning module 710 configured to execute instructions corresponding to step 608 of FIG. 6; a VM creation module 712 configured to execute instructions corresponding to step 610 of FIG. 6; a VM start module 714 configured to execute instructions corresponding to step 612 of FIG. 6; and a VM restoration module 716 configured to execute instructions corresponding to step 614 of FIG. 6. Some or all of the modules may be combined, such that a single module performs the several of the functions described above. Similarly, the functionality of one of the described modules may be split into multiple modules, or redistributed to other modules.

Data Migration

As noted above, the command specifying that the data object(s) should be migrated may specify that all of the data of the source VM should be migrated to the destination VM. This may be, for example, the result of a "convert" command that migrates the totality of the source VM into a destination VM (including data and other resources, such as VM network interfaces, etc.). The source VM may effectively be recreated as a new VM managed by the destination VM's different type of hypervisor. In general, the procedure for migrating a VM from one hypervisor to another involves the following steps, described with reference to FIG. 7.

At step 702, a configuration may be established. The configuration may be established using configuration cmdlets 34. The configuration may specify details of the source and destination hypervisors, VMs, guest OS, and/or storage components involved in the migration, as well as details regarding the network configuration of the source VM and destination VM.

For example, the source VM may be provided by a source hypervisor, and the destination VM may be provided by a destination hypervisor. The source hypervisor and destination hypervisor may differ in hardware virtualization so as to prevent a guest OS running on the source VM from making full use of the destination VM without reconfiguration. For example, the networking configuration of the guest OS may be incompatible with the virtualized networking hardware presented to the guest OS as part of the virtualized hardware environment of the destination VM.

The configuration information collected in step 702 may include an NIC-to-MAC mapping between one or more network interfaces of the source VM and media access control addresses assigned to the one or more network interfaces of the source VM. This mapping may allow a logic flow to recreate the associations between non-virtualized, physical NICs and the virtualized NICs of the virtualized hardware environment despite changes in how the virtualized hardware environment is created.

The configuration information may also include the locations of any storage resources used by the source VM and/or the destination VM.

As part of establishing the configuration, initial configuration parameters may be received by the migration server at step 704. Some initial configuration parameters may be specified through a script, and may be provided by a user. The initial configuration parameters may include: hypervisor information (e.g., the IP address and credentials for each hypervisor's server, such as an ESX server or a HyperV server); a network mapping (e.g., ESX vSwitch A to HyperV vSwitch B; because ESX and HyperV use different virtual switches in this example, the mapping needs to be specified to carry out the migration), information for the Data ONTAP storage cluster (such as login credentials and the cluster's IP address), information about the Guest OS; and other configuration parameters.

Using the initial configuration parameters, the migration server may discover, at step 706, more detailed VM and Guest OS information. For example, based on an input VM name, the migration server may query the VM to discover: the VM configuration (e.g., the number of CPUs, memory size, information about a DVD drive attached to the VM, etc.); a list of virtual disks with backend storage locations; NIC cards associated with the VM; and a disk driver mapping, among other possibilities. Some or all of these steps may also be performed in connection with step 606 of FIG. 6A.

The configuration may be established at step 702 via cmdlets called by a script. The cmdlets may issue commands to the migration server using API commands, and the API commands may have a one-to-one correspondence to the cmdlets.

At step 708, a "convert" command may be called at the client (e.g., a dedicated "convert" cmdlet may be called through a script). The convert command may specify a name of a VM, as well as a direction of conversion (e.g., by specifying a source VM and a destination VM). The convert command may utilize the initial configuration parameters and the configuration information that was discovered by the migration server based on the initial configuration parameters.

The client's convert command may call, at step 710, a corresponding convert command in the migration server's interface (e.g., server interface 40). The convert command is accepted by the web server 42 and sent to the Hypervisor Shifting API 44. The Hypervisor Shifting API 44 in turn calls upon an appropriate service (e.g., first VM service 46 and a second VM service 46, which may be, for example, a Hyper-V Service or the VMWare Service, although other options are possible), depending on the direction of the conversion, in order to issue hypervisor-specific API commands to effect the migration.

At step 712, the migration server obtains a storage mapping 50 (e.g., a list of disks, storage locations, etc.) for the source and/or destination VMs. This may correspond, in some embodiments, to step 604, described above. As noted above, the data may be stored in an ONTAP Data format, but may be exposed in different manners depending on the type of VM that stored the data. The storage mapping 50 may map the hypervisor-specific style of exposing the data for each VM to a common data storage format.

At step 714, the migration server 32 discovers the destination path (i.e., the location of the destination disk directory at which converted data from the source VM will be stored) based on data obtained from the storage mapping. This may correspond, in some embodiments, to step 606, described above. The migration server then calls a Disk Conversion Library to convert the source VM data into a format compatible with the destination VM disk type.

At this stage, the migration server 32 has generated destination disks capable of being read by the destination VM. At step 716, the migration server now starts the source VM, and stores information (e.g., the source IP address, an authenticated user name and password, connecting switch information, etc.) in the source VM at step 718. The migration server then contacts the destination host at which the destination VM will be set up, and creates a new VM using the generated destination disks at step 720. The stored information is copied to the new VM at step 722 (this may correspond to steps 608 and 610, discussed above), and the conversion process is complete.

Computer-Related Embodiments

Figure 8:
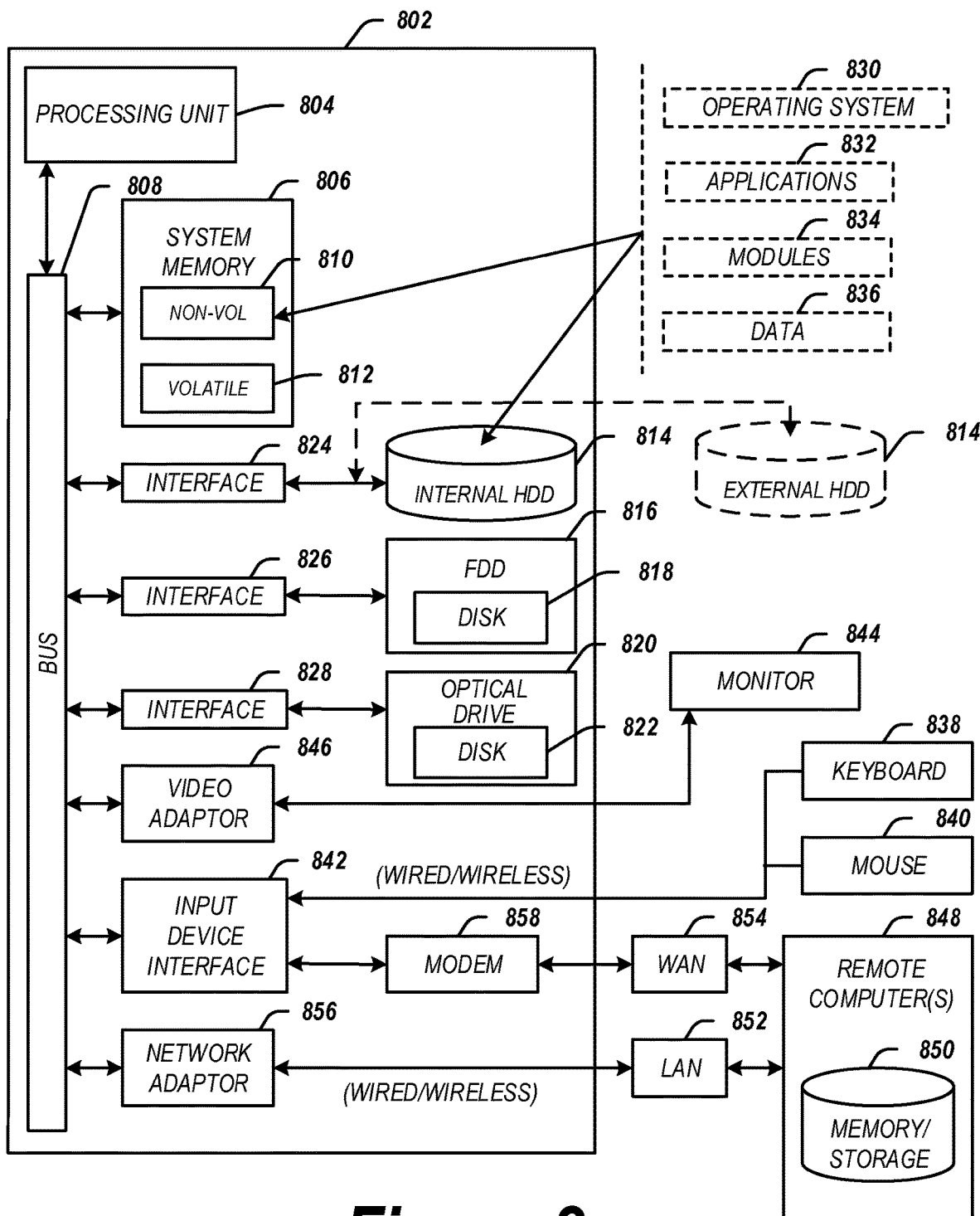
FIG. 8 depicts an exemplary computing device suitable for use with exemplary embodiments.

The above-described method may be embodied as instructions on a computer readable medium or as part of a computing architecture. FIG. 8 illustrates an embodiment of an exemplary computing architecture 800 suitable for implementing various embodiments as previously described. In one embodiment, the computing architecture 800 may comprise or be implemented as part of an electronic device.

Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806, and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 810, 812, including an OS 830, one or more application programs 832, other program modules 834, and program data 836. In one embodiment, the one or more application programs 832, other program modules 834, and program data 836 can include, for example, the various applications and/or components of the system 30.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 842 that is coupled to the system bus 808, but can be connected by other interfaces such as a parallel port, IEEE 694 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
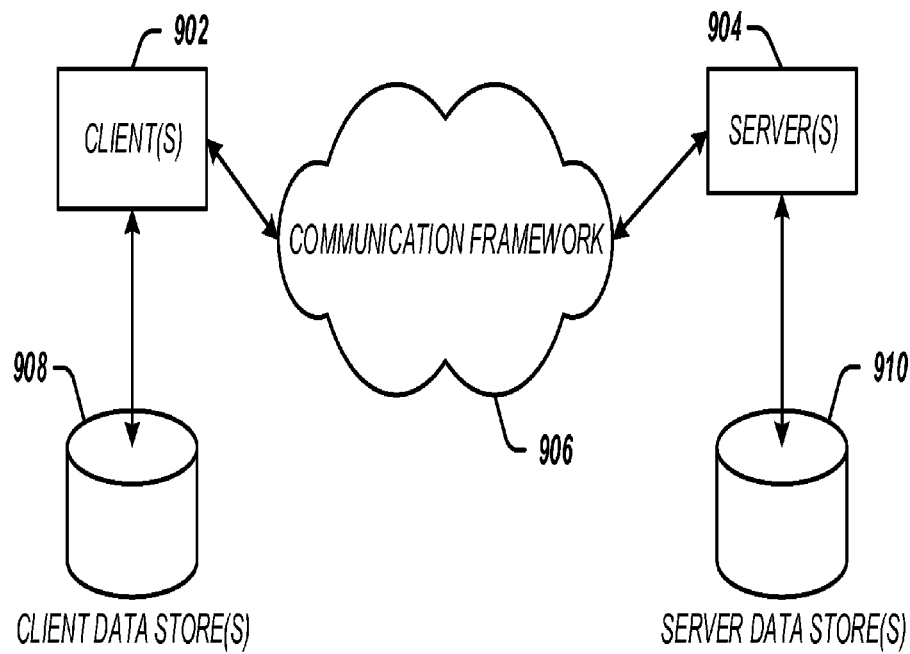
FIG. 9 depicts an exemplary network environment suitable for use with exemplary embodiments.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may implement the client device 14 shown in FIG. 1. The servers 604 may implement the server device 104 shown in FIG. 1A. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method comprising:
   executing, by a migration application, a script within an operating system of a first virtual machine hosted by a first hypervisor to obtain configuration information comprising network interface and storage path information of the first virtual machine, wherein the executing comprises:
      evaluating a storage mapping to identify the storage path information corresponding to physical storage locations within a physical storage device at which data of a first virtual disk used by the first virtual machine is stored by the first hypervisor through a storage operating system and is exposed by the first hypervisor to the first virtual machine, wherein the storage mapping comprises:
         a list of storage locations within the first virtual disk utilized by the first virtual machine to store the data within the first virtual disk; and
         a mapping of a common data storage format, used by the storage operating system to store data within the physical storage device, to a first hypervisor-specific style of how the first hypervisor exposes the data of the first virtual disk to the first virtual machine according to a first virtual disk format;
   storing the configuration information within the first virtual disk of the first virtual machine;
   cloning the first virtual disk to create a cloned virtual disk; and
   starting a second virtual machine using the configuration information by attaching the cloned virtual disk to the second virtual machine.

2. The method of claim 1, wherein the first virtual disk comprises a first arrangement of blocks corresponding to the first virtual disk format of the first hypervisor and the cloned virtual disk comprises a second arrangement of the blocks corresponding to a second virtual disk format of a second hypervisor managing the second virtual machine, wherein the blocks are shared by and comprise data common to the first virtual machine and the second virtual machine.

3. The method of claim 1, wherein the first virtual machine uses a first technology to access a network using a first virtualized network interface and the second virtual machine uses a second technology, different than the first technology, to access the network using a second virtualized network interface.

4. The method of claim 1, comprising:
using the configuration information to clone the first virtual disk according to a hypervisor-agnostic format.

5. The method of claim 1, comprising:
recreating network interfaces and user configuration settings of the first virtual machine for the second virtual machine.

6. The method of claim 1, wherein the first virtual disk is copied to a second hypervisor managing the second virtual machine as the cloned virtual disk for use by the second virtual machine, and wherein a hardware setup of the first virtual machine is reconfigured at the second hypervisor for the second virtual machine in a same hardware configuration as at the first hypervisor for the first virtual machine.

7. The method of claim 1, comprising:
generating a second script for execution by the second virtual machine based upon the configuration information.

8. The method of claim 1, comprising:
converting, by the migration application, a migration command to a hypervisor specific command to be executed by the first virtual machine.

9. The method of claim 1, comprising:
converting, by the migration application, a migration command to a hypervisor specific command to be executed by the second virtual machine.

10. The method of claim 1, wherein the first virtual disk and the cloned virtual disk share common blocks of data used by the first virtual machine and the second virtual machine, and wherein the first virtual disk references the common blocks according to a first arrangement different than a second arrangement used by the cloned virtual disk to reference the common blocks.

11. The method of claim 10, wherein the first virtual disk comprises a first management block comprising data used by the first hypervisor to manage the common blocks used by the first virtual machine, and wherein the cloned virtual disk comprises a second management block comprising data used by a second hypervisor to manage the common blocks used by the second virtual machine.

12. The method of claim 11, wherein the cloning creates the cloned virtual disk to comprise the common blocks of data used by the first virtual machine and the second management block, and to exclude the first management block.

13. The method of claim 1, comprising:
storing data of the first virtual disk in a hypervisor agnostic data storage format within data storage.

14. The method of claim 1, wherein the configuration information is stored within a first configuration file, and the method comprising:
cloning the first configuration file to create a second configuration file accessible to a second hypervisor managing the second virtual machine.

15. The method of claim 1, comprising:
storing, within a file system, first virtual machine configuration file blocks of the first virtual machine, second virtual machine configuration file blocks of the second virtual machine, and virtual disk blocks of data shared amongst the first virtual disk of the first virtual machine and the cloned virtual disk of the second virtual machine.

16. The method of claim 1, wherein the first virtual machine arranges data within the first virtual disk onto storage hardware according to a first format and the second virtual machine arranges the data within the cloned virtual disk onto the storage hardware according to a second format different than the first format.

17. A non-transitory machine readable medium comprising instructions for performing a method, which when executed by a machine, causes the machine to:
execute, by a migration application, a script within an operating system of a first virtual machine hosted by a first hypervisor to obtain configuration information comprising network interface and storage path information of the first virtual machine, wherein the executing comprises:
evaluating a storage mapping to identify the storage path information corresponding to physical storage locations within a physical storage device at which data of a first virtual disk used by the first virtual machine is stored by the first hypervisor through a storage operating system and is exposed by the first hypervisor to the first virtual machine, wherein the storage mapping comprises:
a list of storage locations within the first virtual disk utilized by the first virtual machine to store the data within the first virtual disk; and
a mapping of a common data storage format, used by the storage operating system to store data within the physical storage device, to a first hypervisor-specific style of how the first hypervisor exposes the data of the first virtual disk to the first virtual machine according to a first virtual disk format;
store the configuration information within the first virtual disk of the first virtual machine;
clone the first virtual disk to create a cloned virtual disk; and
start a second virtual machine using the configuration information by attaching the cloned virtual disk to the second virtual machine.

18. The non-transitory machine readable medium of claim 17, wherein the first virtual disk comprises a first arrangement of blocks corresponding to the first virtual disk format of the first hypervisor and the cloned virtual disk comprises a second arrangement of the blocks corresponding to a second virtual disk format of a second hypervisor managing the second virtual machine, wherein the blocks are shared by and comprise data common to the first virtual machine and the second virtual machine.

19. A computing device comprising:
a memory comprising machine executable code for performing a method; and
a processor coupled to the memory, the processor configured to execute the machine executable code to cause the processor to:
execute, by a migration application, a script within an operating system of a first virtual machine hosted by a first hypervisor to obtain configuration information comprising network interface and storage path information of the first virtual machine, wherein the executing comprises:
evaluating a storage mapping to identify the storage path information corresponding to physical storage locations within a physical storage device at which data of a first virtual disk used by the first virtual machine is stored by the first hypervisor through a storage operating system and is exposed by the first hypervisor to the first virtual machine, wherein the storage mapping comprises:
a list of storage locations within the first virtual disk utilized by the first virtual machine to store the data within the first virtual disk; and a mapping of a common data storage format, used by the storage operating system to store data within the physical storage device, to a first hypervisor-specific style of how the first hypervisor exposes the data of the first virtual disk to the first virtual machine according to a first virtual disk format;

store the configuration information within the first virtual disk of the first virtual machine;

clone the first virtual disk to create a cloned virtual disk; and start a second virtual machine using the configuration information by attaching the cloned virtual disk to the second virtual machine.

20. The computing device of claim 19, wherein the first virtual disk comprises a first arrangement of blocks corresponding to the first virtual disk format of the first hypervisor and the cloned virtual disk comprises a second arrangement of the blocks corresponding to a second virtual disk format of a second hypervisor managing the second virtual machine, wherein the blocks are shared by and comprise data common to the first virtual machine and the second virtual machine.

* * * * *